US011755763B2

(12) United States Patent
Emmanuel et al.

(10) Patent No.: US 11,755,763 B2
(45) Date of Patent: Sep. 12, 2023

(54) USER-CONTROLLED VIEWING PREFERENCES

(71) Applicant: Rovi Guides, Inc., San Jose, CA (US)

(72) Inventors: Daina Emmanuel, Bangalore (IN); Padmassri Chandrashekar, Karnataka (IN)

(73) Assignee: Rovi Guides, Inc., San Jose, CA (US)

( * ) Notice: Subject to any disclaimer, the term of this patent is extended or adjusted under 35 U.S.C. 154(b) by 44 days.

(21) Appl. No.: 17/245,563

(22) Filed: Apr. 30, 2021

(65) Prior Publication Data
US 2022/0350906 A1    Nov. 3, 2022

(51) Int. Cl.
*G06F 16/21*    (2019.01)
*G06F 21/62*    (2013.01)

(52) U.S. Cl.
CPC .......... *G06F 21/6218* (2013.01); *G06F 16/21* (2019.01)

(58) Field of Classification Search
CPC ............ G06F 21/6218; G06F 16/21; G06F 16/24575; G06F 16/9035; G06F 21/10
See application file for complete search history.

(56) References Cited

U.S. PATENT DOCUMENTS

| 10,104,438 | B1* | 10/2018 | Thompson | ......... H04N 21/4821 |
| 2016/0253710 | A1* | 9/2016 | Publicover | ......... H04N 21/2187 705/14.66 |
| 2021/0390196 | A1* | 12/2021 | Lavine | ................ G06F 21/6218 |

OTHER PUBLICATIONS

U.S. Appl. No. 17/245,566, filed Apr. 30, 2021, Daina Emmanuel.

* cited by examiner

*Primary Examiner* — Apu M Mofiz
*Assistant Examiner* — Cindy Nguyen
(74) *Attorney, Agent, or Firm* — Haley Guiliano LLP

(57) ABSTRACT

Systems and methods are described to a database comprising multiple database records, where each database record comprises an attribute of a content item consumed by a user and an indication of a user device used by the user to consume the content item, and is associated with an indication of whether a content provider should be granted access to the respective database record. An option to modify whether or not the content provider should be granted access to the respective database record is provided for each database record of the database records, and each database record that is associated with an indication that the content provider should be granted access is transmitted to the content provider, to enable the content provider to generate and transmit a content recommendation based on at least one of the database records transmitted to the content provider.

20 Claims, 10 Drawing Sheets

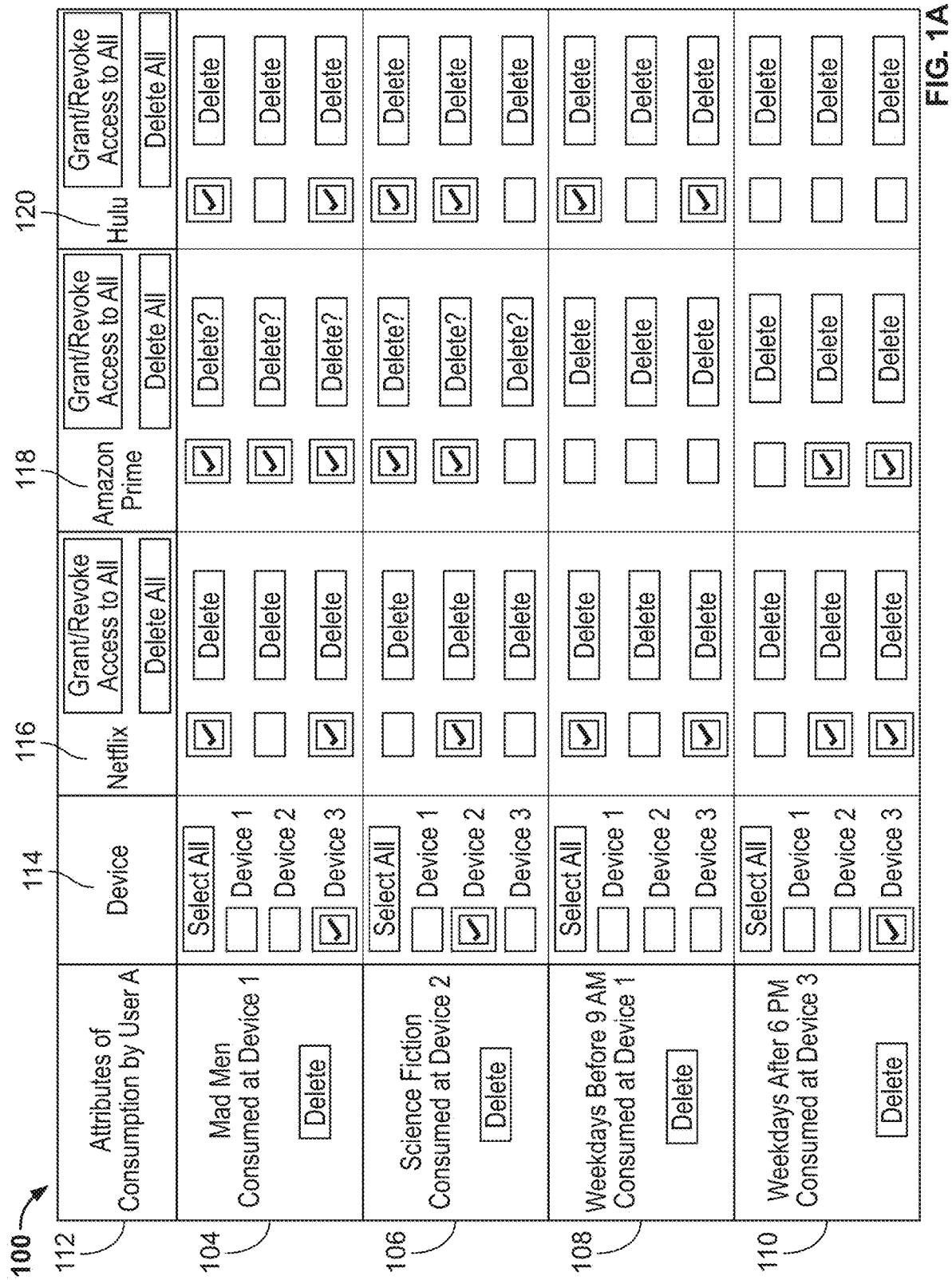

USER-CONTROLLED VIEWING PREFERENCES

BACKGROUND

This disclosure is directed to controlling which content consumption data of a user a content provider is permitted to access. Specifically, techniques are disclosed for transmitting to a content provider a database record that is associated with an indication that the content provider should be granted access, and receiving a content recommendation based on such transmitted database record. In addition, techniques are disclosed for receiving a content recommendation from a content provider based on a token, stored at a distributed ledger, that the content provider has been granted access to and is capable of recovering.

SUMMARY

Modern media distribution systems enable a user to access more media content than ever before. With such a large amount of content at a user's fingertips, it may be difficult for some users to quickly locate content they might be interested in. In one approach, media providers make use of a user's data (e.g., viewing history, location) to generate content recommendations tailored to the user. However, in such approach, content providers may provide users minimal control over how their data is used by the content providers, or which data is used by content providers to generate these content recommendations. Moreover, even if a user does not mind that a particular content provider has access to his or her data, the user is not provided by the content provider any mechanism of selectively notifying other content providers of his or her preferences built up over time in connection with the particular content provider, or removing data gathered by a content provider (e.g., if the user desires to end his or her subscription with the particular provider). As another example, content providers often fail to base their content recommendations on the optimal portions of a user's viewing data. For example, even though a user might only watch certain types of content in a first circumstance (e.g., when accessing content from a particular content provider and/or at a particular time of day and/or on a particular device), content providers often allow metadata from the first circumstance to contaminate recommendations provided to the user in a second circumstance that has no overlap the with the first circumstance (e.g., when the user is accessing content from a different content provider and/or at a different time of day and/or at a different device than in the first circumstance).

To overcome these problems, systems and methods are provided herein for accessing a database comprising a plurality of database records, where each database record: comprises (a) an attribute of a content item consumed by a user and (b) an indication of a user device used by the user to consume the content item, and is associated with an indication of whether a content provider should be granted access to the respective database record. An option to modify whether or not the content provider should be granted access to the respective database record is provided for each database record of the plurality of database records, and each database record that is associated with an indication that the content provider should be granted access is transmitted to the content provider, to enable the content provider to generate and transmit a content recommendation based on at least one of the database records transmitted to the content provider. In some embodiments, the attribute of the content item may correspond to any level of granularity, e.g., a single content consumption event associated with a particular content provider consumed at a particular device, or content consumption events over an extended period of time with various content providers consumed via various devices.

Such aspects enable a user to selectively specify which content provider(s) should be granted access to the user's data in connection with a particular content item consumed by the user. For example, the systems and methods may provide the user with the ability to withhold certain content item consumption data from one or more content providers for any suitable reason, such as to ensure that content consumed at a first device at a first time of day (e.g., a short comedy clip consumed on a mobile device during a morning commute) does not impact recommendations at a second device at a second time of day (e.g., in the evening when a user is at home, where the user typically watches action movies on a smart television). In addition, such aspects provide the ability to avoid the circumstance in which content consumed via a first content provider (e.g., with which the user consumes the content related only or primarily to the genre of comedy) to contaminate content recommendations provided via a second content provider (e.g., with which the user consumes only or primarily other types of content, such as content related to the science fiction genre). Thus, the systems and methods provide the user with more control over his or her data, by enabling the user to decide to share his or her data with content providers only in certain circumstances.

In addition, systems and methods are provided herein for monitoring consumption of a content item at a user device and generating a token based on the monitored consumption, where the token represents (a) an attribute of the content item and (b) demographic data of a user associated with the user device. An input granting a first content provider access to the token and denying a second content provider access to the token is received, and the token is converted into a first format. Converted token data associated with the first format is stored in a distributed ledger that is accessible to the first content provider and the second content provider, where the first content provider is capable of recovering the token from the converted token data and the second content provider is not capable of recovering the token from the converted token data. A content recommendation is received from the first content provider, where the recommendation is based on the token recovered by the first content provider.

Such aspects provide a mechanism for a user to selectively grant certain content providers access to tokens stored on a distributed ledger. That is, such aspects provide a secure mechanism for the storage of the consumption data discussed above and transfer of such data between the user and authorized content providers and/or between users and/or between content providers. For example, while the presence of a token may be visible to each content provider having access to the distributed ledger, only certain content providers may gain access to the information represented by the token (e.g., where the user's device encrypts the token with a public key of the first content provider, and the private key of a public key-private key pair is used by the content provider to decrypt the token). Thus, the systems and methods provide the user with the ability to conveniently grant or deny certain content providers access to consumption data of the user, delete certain tokens, and/or port viewing preferences from one content provider to another content provider.

In some embodiments, the attribute of the content item comprises one or more of a title of the content item, a genre of the content item, a microgenre of the content item, a time stamp associated with the consumption of the content item, content provider information associated with the content item, artist information associated with the content item, and a device profile of the device used to consume the content item, or any other suitable attribute.

In some aspects of this disclosure, in response to receiving a request from the user to share user preferences with the content provider, a data control application performs the transmitting to the content provider of each database record that is associated with the indication that the content provider should be granted access, and refrains from transmitting database records without the indication that the content provider should be granted access.

In some embodiments, each database record comprises a respective indication of whether a content provider should be granted access to the respective database record. A database record of the plurality of database records may comprise an indication that a first content provider should be granted access to the database record and an indication that a second content provider should not be granted access to the database record.

In some aspects of this disclosure, the content recommendation from the content provider is received in response to a search query input by the user, and the content recommendation comprises promoting a rank of content items returned in response to the search query based on the at least one database record transmitted to the content provider.

In some embodiments, the content recommendation received from the content provider is generated based on the user device being used by the user and the database records transmitted to the content provider associated with the user device.

In some aspects of this disclosure, providing, for each database record of the plurality of database records, the option to modify whether or not the content provider should be granted access to the respective database record comprises one or more of generating for display a graphical user interface comprising the option and an option to delete one or more of the plurality of database records; generating for display a graphical user interface comprising the option and an option to deny a particular content provider access to each of the database records of the user; and/or generating for display a graphical user interface comprising in tabular form the plurality of database records to the user along with an option for each respective database record to modify whether or not the content provider should be granted access to the respective database record.

In some embodiments, the demographic data of the token comprises one or more of an age of the user, a location of the user, and interests of the user.

In some aspects of this disclosure, converting the token into a first format comprises encrypting the token using a public key of the first content provider; and recovering the token from the converted token data comprises decrypting the token using a private key of the first content provider. The data control application may be further configured to determine that each of the public key and the private key has expired, where each of the public key and the private key expire after a predetermined period of time; and, in response to determining that each of the public key and the private key has expired, automatically access a new private key and public key pair.

In some embodiments, in response to determining that the user has granted the first content provider access to the token, the data control application may be configured to provide digital currency to the user, where the digital currency enables the user to redeem a content item that is otherwise inaccessible to the user.

In some aspects of this disclosure, the data control application may provide an option to designate at least a portion of the information represented by the token as public, where designating the information as public grants each of the first and second content providers access to an anonymized version of the portion of the information. The data control application may additionally or alternatively provide an option to designate at least a portion of the information represented by the token as private, where designating the information as private requires the first content provider and the second content provider to recover the token from the converted token data in order to gain access to the information represented by the token.

In some embodiments, the data control application may provide an option to rescind access to the token granted to the first content provider, where rescinding access comprises causing the public key and private key to expire. In some embodiments, the data control application may generate for display a graphical user interface comprising an option to delete the token.

BRIEF DESCRIPTION OF THE DRAWINGS

The above and other objects and advantages of the present disclosure will be apparent upon consideration of the following detailed description, taken in conjunction with the accompanying drawings, in which like reference characters refer to like parts throughout, and in which:

FIG. 1A shows an exemplary graphical user interface enabling a user to modify database records, each comprising an attribute of a content item consumed by a user and an indication of a user device used by the user to consume the content item, in accordance with some embodiments of this disclosure;

DETAILED DESCRIPTION

Figure 1B:
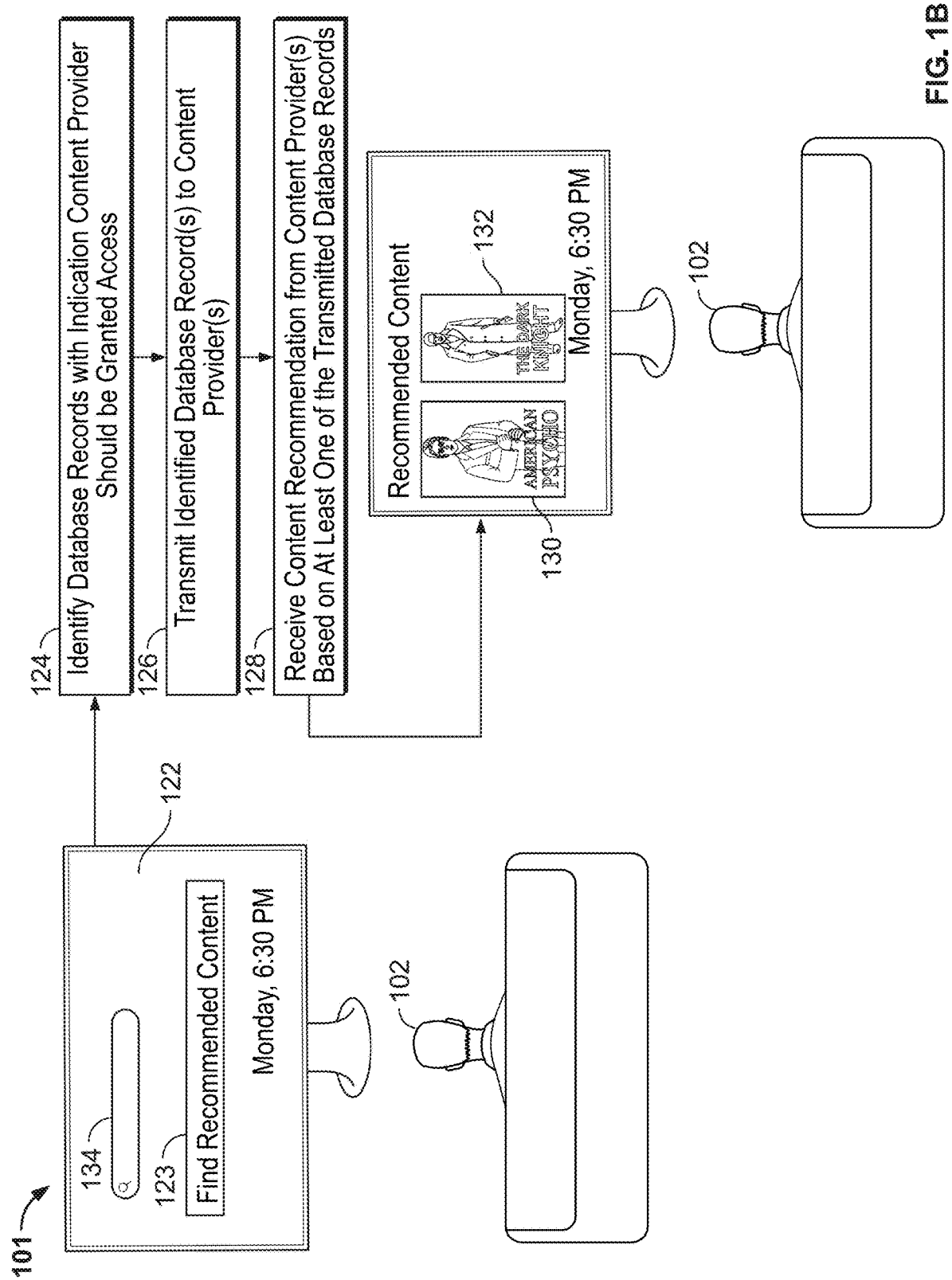
FIG. 1B shows a block diagram of an illustrative system for transmitting to a content provider each database record that is associated with an indication that the content provider should be granted access, to enable the content provider to generate and transmit a content recommendation, in accordance with some embodiments of this disclosure.

FIG. 1A shows an exemplary graphical user interface 100 enabling a user to modify database records 104, 106, 108, 110, each comprising an attribute 112 of a content item consumed by a user and an indication of a user device used by the user to consume the content item, in accordance with some embodiments of this disclosure. Attributes 112 may comprise, for example, a title (e.g., "Mad Men" included in database record 104) of a content item; a genre (e.g., "Science Fiction" included in database record 106); microgenres of a subgenre of the content item; time stamps of when the content item was consumed (e.g., on a weekday before 9 AM, included in database record 108, or weekdays after 6 PM, shown as part of database record 110); a content provider source; a transaction start date and end date; an artist of the content item; a search performed to access the content item; a device profile of a device on which the content item is consumed; and/or demographic information of user 102, or any other suitable attribute. In some embodiments, the attribute of the content item may correspond to any level of granularity, e.g., a single content consumption event associated with a particular content provider consumed at a particular device, or content consumption events over an extended period of time with various content providers consumed via various devices.

Each database record may be associated with a particular user (e.g., user 102 of FIG. 1B) subscribed to various content providers, where the user consumes various content items distributed and/or created by the content providers. As referred to herein, the term "content item" should be understood to refer to an electronically consumable user asset, e.g., television programming, as well as pay-per-view programs, on-demand programs (as in video-on-demand (VOD) systems), Internet content (e.g., streaming content, downloadable content, webcasts, etc.), video clips, audio, playlists, websites, articles, electronic books, blogs, social media, applications, games, and/or any other media or multimedia, and/or combination of the above.

When a data control application receives information (e.g., from content provider 116) indicating that user 102 has consumed or is consuming (e.g., playing, recording or otherwise interacting with) a content item (e.g., "Mad Men") associated with a particular content provider (e.g., Netflix™ 116), the content provider may generate a token associated with the consumption of the content item by user 102. The token may be understood as an alphanumeric string representing attributes and/or metadata of the content item. The data control application (e.g., running at least in part on data control server 712 of FIG. 7 associated with database 714, where database records 104, 106, 108, 110, may be stored) may receive the token from the content provider, and generate database record 104 based on the received token (e.g., associated with the consumption of "Mad Men" by user 102 via content provider 116. Database record 104 may include at least one attribute 112 of the content item (e.g., a title) and an indication of a device used to consume the content item (e.g., Device 1). Database record 104 may further include, or otherwise be associated with, an indication of whether a particular content provider from among one or more content providers should be granted access to the respective database record. Such indications may be based on selections received by the data control application from user 102 as to whether to grant certain content providers access to one or more attributes of the database record. Such selections received by the data control application from user 102 may be at various levels of granularity (e.g., on an item-by-item basis for each attribute 112, device 114 and content provider 116, 118, or 120 combination) and/or set more globally (e.g., the data control application may receive selection from user 102 to allow all content providers 116, 118, 120 access to a certain attribute of consumption data for a particular device 114, or to allow a certain content provider access to all consumption data, or to allow a certain content provider access to only certain attributes, etc.). The data control application may allow user 102 to revoke certain access permissions previously given to content providers for a particular attribute, and selectively delete certain attribute 112 and device 114 pairs for a content provider or delete a content provider's access to any or all attributes. Such revocation of permissions and/or deletion of consumption data may be performed using any of a variety of techniques. For example, a distributed ledger, described above and below, may be employed, or content providers may voluntarily delete data at the user's request.

For example, based on selection of one or more options (e.g., checked boxes) in the column associated with content provider 116 by user 102, a particular content provider (e.g., Netflix) may be granted access to the title of the consumed content item on Devices 1 and 3, but not on Device 2 (e.g., the data application may receive input from user 102 to permit Netflix to use this attribute in generating content recommendations for user 102 on Devices 1 and 3, but not for generating content recommendations for user 102 on Device 2). On the other hand, based on selections received in column 118, another content provider (e.g., Amazon Prime™) may be granted access to database record 104 for the purposes of generating content recommendations (or otherwise collecting the data for other purposes) on each of Devices 1, 2, and 3 based on selections by user 102. In addition, in column 120, another content provider (e.g., Hulu™) may be granted access to database record 104 for the purposes of generating content recommendations for Devices 1 and 3, but may not be granted access to such data for the purposes of generating content recommendations for Device 2, based on selections by user 102.

In some embodiments, providing users with the above-mentioned granular control of which attributes to share with certain content providers, e.g., for the purposes of generating content recommendations for certain devices of the user, may be beneficial if the user utilizes distinct devices (and/or distinct content providers) to consume content at different times of the day. For example, the data control application may receive information indicating that user 102 typically consumes a first type of content (e.g., a news program) during morning hours before 9 AM on weekdays on a first device (e.g., a mobile device) via a first content provider (e.g., Hulu), as shown in database record 108, such as during his or her morning commute on a train. On the other hand, the data control application may receive information indicating that user 102 typically consumes a different type of content (e.g., a romantic comedy) on weekdays after 6 PM on a second device (e.g., a smart television) via the same content provider or a second content provider (e.g., Amazon Prime), such as when user 102 returns home after work. By enabling the user to selectively choose not to share attributes of content consumed by user 102 at 9 AM on weekdays via the first content provider with the second content provider (and vice versa), the data control application provides the user with more control over what recommended content he or she is presented at different times of day (e.g., such as by way of a universal search page or a home page aggregating recommendations from multiple content providers). In some embodiments, the data control application may allow a user to request a particular content provider to disregard certain information when generating content recommendations (e.g., so that the same content provider provides news recommendations on weekday morning, but romantic comedies on weekday evenings). Thus, the data control application enables user 102 to control which data content providers may access to generate recommendations, and thus what types of recommendations he or she is to receive depending on the time of day and/or content provider and/or device, e.g., by causing certain attributes or metadata to be masked or withheld from certain content providers.

As another example, user 102 may access a content provider's service via an account that user 102 shares with multiple other users (e.g., friends or family of the user), and user 102 may enjoy content items of the genre "Science Fiction" (e.g., included in database record 106). However, user 102, for a variety of reasons, may not wish recommendations of other users that use the same profile to be impacted by his or her content consumption. For example, user 102 may know that the rest of the family does not enjoy the same genre, and thus user 102 may wish to avoid his or her consumption of Science Fiction movies from causing similar movies to be recommended to the other users who utilize the profile, or the user may be embarrassed about certain content he enjoys watching. Thus, the data control application enables user 102 to grant content providers access to the genre attribute on Device 2 (e.g., if only user 102 watches content on this device) while enabling the user to deny the content providers permission to use the genre attribute in connection with generating recommendations on Device 3 (e.g., since other users also accessing content via the content provider account typically use this device).

As discussed above, the data control application may enable user 102 to transfer his or her preferences from one content provider to another content provider. For example, the data control application may, upon receiving a user selection to permit an attribute of content consumed via a first content provider with a second content provider, transmit the attribute to the second content provider over a network. Thus, user 102 can selectively port his or her content consumption history on certain devices with a first content provider to a second content provider, and the second content provider may utilize this information to tailor recommendations to user 102 without user 102 having to build up a consumption history with the second content provider.

Exemplary pseudo code which may be executed by the data control application to selectively grant content providers access to certain attributes of content items consumed by user 102 is shown below. For example, the <public> tag may denote that all content providers are granted access to the database record, whereas the <private> tag may denote that only certain selected content providers are granted access to the database record.

```
<device1>
  <Source>
    Netflix <public>
    VOD <public>
    Hulu <public>
    YouTube <public>
  </Source>
<Genre>Action<public>
    Adventure <public>
    Anime <public>
    Children Movies <public>
    Classic <public>
    Comedy <public>
    Documentary <public>
    Sci Fi <private> <P1><P2>
    Fantasy < private ><P1>
    Sports <public> Thriller <public>
</Genre>
<Artist>
    <Name> <private><P2>
</Artist>
<Title>
    <Name><private> <p1>
</Title>
</device1>
```

FIG. 1B shows a block diagram of an illustrative system 101 for transmitting to a content provider each database record that is associated with an indication that the content provider should be granted access, to enable the content provider to generate and transmit a content recommendation, in accordance with some embodiments of this disclosure. As shown in FIG. 1B, user 102 is requesting content for viewing on user equipment device 122 (e.g., a smart television, such as via a particular content provider or a home page of a universal search application or content aggregator application) at a particular time (e.g., 6:30 PM on a Monday). The data control application may be implemented at least in part on user equipment device 122, and may determine based on user input that user 102 is interested in viewing content. For example, user equipment device 122 may receive user input from user 102 to navigate to a recommended content portion 123 of a graphical user interface (GUI) of user equipment 122, associated with a particular content provider, or user equipment device 122 may receive user input from user 102 to navigate to a universal search interface or home screen that aggregates recommendations from multiple content providers.

At 124, the data control application may identify one or more database records, e.g., from among database records 104, 106, 108, 110 of FIG. 1B, that are associated with an indication that the particular content provider (e.g., associated with recommended content portion 123) should be granted access. For example, the data control application may determine that user 102 has indicated (e.g., by checking an option as shown in column 116 of FIG. 1A) that the content provider Netflix should be granted access to an attribute of "genre: Action" associated with user equipment device 122, and an attribute of "actor: Christian Bale" associated with user equipment device 122. The data control application may transmit these database records to Netflix (e.g., content provider 706 of FIG. 7), to enable Netflix at 128 to generate and transmit one or more content recommendations 130, 132 based on at least one of the database records transmitted to the content provider. For example, content recommendations 130, 132 may be provided based on sharing the attributes of action movies and featuring Christian Bale in a cast thereof, as specified in the database records provided to Netflix. In some embodiments, the data control application may refrain from transmitting database records without the indication that the content provider should be granted access. In some embodiments, the data control application may determine certain database records have already been transmitted to the content provider at a previous time, and thus may not transmit such database records each time user 102 requests to access the content provider's content.

In some embodiments, the content recommendation from the content provider is received in response to a search query input by user 102 (e.g., via search bar 134), where a rank of content items returned in response to the search query is promoted based on the at least one database record transmitted to the content provider. For example, search results may be displayed more prominently to user 102 that match the attribute specified in the transmitted database record, even if other search results would otherwise more closely match the search query. In some embodiments, the content recommendation received from the content provider is generated based on the user device being used by the user and the database records transmitted to the content provider associated with the user device. For example, the content provider may use the consumption data indicating user 102 has frequently consumed content of the genre "Action" on user equipment 122 on weekday evenings, and provide content recommendations 130, 132 based on this data.

Figure 2:
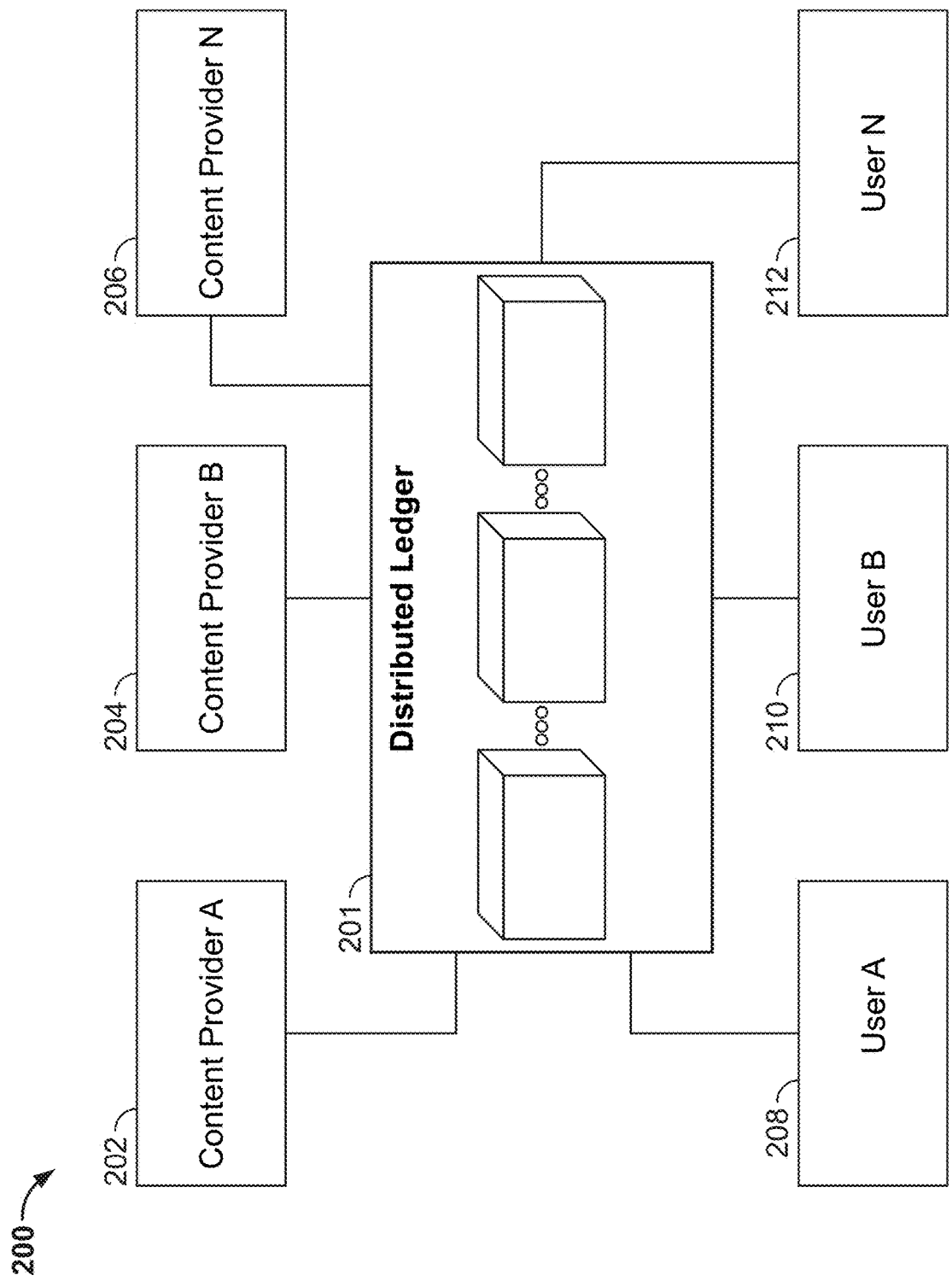
FIG. 2 shows an illustrative example of a distributed blockchain ledger, in accordance with some embodiments of the disclosure.

FIG. 2 shows an illustrative example of a distributed blockchain ledger 201, in accordance with some embodiments of the disclosure. In particular, FIG. 2 shows an exemplary blockchain system 200 that includes multiple computing devices (that may be referred to herein as "community") having access to distributed ledger 201. In some embodiments, distributed ledger 201 may be a blockchain distributed ledger. Each of content creators, providers and/or distributors 202, 204, 206 and computing systems of users 208, 210, 212 may have access to distributed ledger 201. Content providers 202, 204, 2016 (e.g., Netflix, Amazon Prime, Hulu, HBO™, Spotify™, Apple Music™, Pandora™, etc.) may store content items for access by user device 208, 210, 212 subscribed to the content provider, and transmit the content item to the user device in response to receiving a user request for the content item over a network (e.g., communication network 704 of FIG. 7).

The community may have access to distributed ledger 201. In some embodiments, each member of the community 202-212 may store a local copy of distributed ledger 201. The local copies may be updated via continuous or peer-to-peer communications between community members 202-212. The integrity of the blockchain may be verified by examining blocks of distributed ledger 201 that are linked by a sequence of hashes (e.g., as described with respect to FIG. 4). In some embodiments, such verification may confirm attributes of blocks based on a proof of work (e.g., an indication that a user expended effort by way of consuming the content, such as, for example, an indication from the content provider that substantially all of the content was played back at the user device).

Distributed ledger 201 may be used to store attribute or metadata information for a set of media content items consumed by one or more of users associated with user devices 208, 210, 212. For example, the data control application may be implemented at least in part on user devices 208, 210, 212 and execute instructions stored thereon to monitor consumption of a content item at user device 208, and generate a token (e.g., an alphanumeric string representing one or more attributes or metadata characteristics of a content item consumed by a user) based on the monitored consumption. The token may further include demographic information of a user associated with user device 202 (e.g., a male in the Northeast of the United States, in the age of group of 30-40 years old, having consumed an episode of "Mad Men," interested in the genre o Drama, etc.). In some embodiments, the attribute may comprise, for example, a title (e.g., "Mad Men" included in database record 104) of a content item, a genre (e.g., "Science Fiction" included in database record 106 of FIG. 1A), microgenres of a subgenre of the content item, time stamps of when the content item was consumed (e.g., on a weekday before 9 AM, included in database record 108 of FIG. 1A, or weekdays after 6 PM, shown as part of database record 110 of FIG. 1A), a content provider source, a transaction start date and end date, an artist of the content item, a search performed to access the content item, a device profile of a device on which the content item is consumed, and/or demographic information of the user, or any other suitable attribute.

The generated token may be associated with different access rights for different content providers. For example, the data control application may receive selection from a user of user device 208 (e.g., via the GUI of FIG. 1A) to grant a first content provider access to a token and deny a second content provider access to the token. Such token may be stored as part of a block of distributed ledger 201. Since each member of the community may have access to such block, the token may be converted to a particular format in order to restrict certain content providers access to the token, as specified by the user. For example, the data control application may employ asymmetric cryptography (e.g., a public key-private key pair) or symmetric cryptography (e.g., using the same key to encrypt and decrypt, provided only authorized content providers have access to the symmetric key) or any combination thereof to encrypt the token. For example, the data control application may utilize a public key-private key pair by encrypting the token using a public key of a first content provider (e.g., Amazon Prime) having been granted access to the token, and the content provider may recover such token by decrypting the token using a private key of the first content provider. While all members of the community may have access to the public key, only the content provider may have access to the private key. On the other hand, another content provider (e.g., Netflix) denied access to the token based on user selection (e.g., by way of a check mark associated with the content provider and provided at the GUI of FIG. 1A) may not have access to the private key (e.g., of Amazon Prime) and thus is not able to access the token converted into the particular format. Since the first content provider has been granted access to the token, a content recommendation based on the content item attributes specified in the token and the demographic data specified in the token may be received from the first content provider. In this way, the data control application may enable a user to selectively decide which content providers to grant access to his or her data stored at distributed ledger 201.

If the data control application determines (e.g., based on user input received via GUI 100 of FIG. 1A) that multiple content providers are to be granted access to a token, the data control application may perform respective encryptions of the token for each content provider. For example, the data control application may generate (and/or receive from a content provider) a public-private-key pair for each respective content provider and store multiple ciphertexts for each respective content provider.

Figure 3:
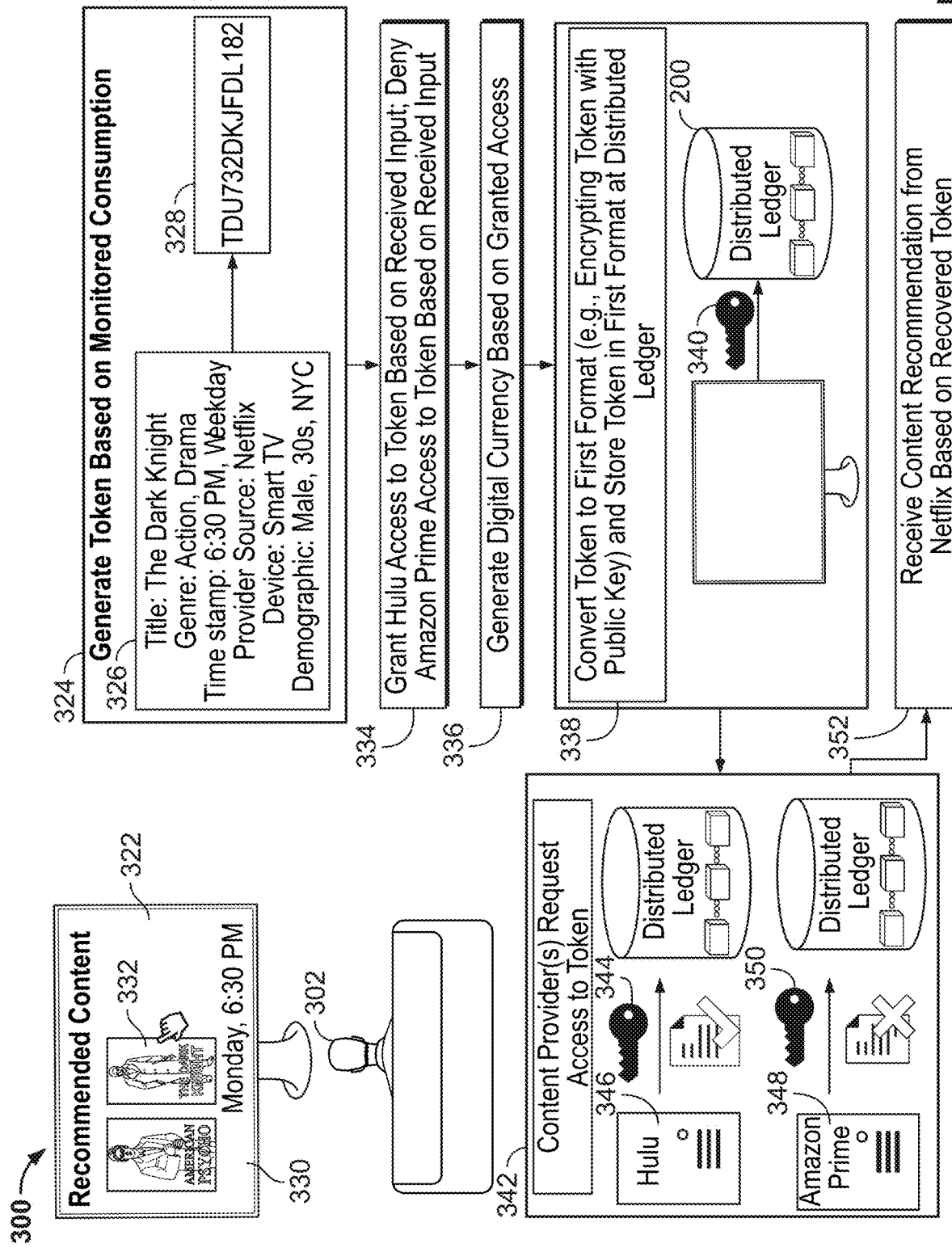
FIG. 3 shows a block diagram of an illustrative system for receiving a content recommendation from a first content provider, based on a token stored in a distributed ledger and recovered by the first content provider, in accordance with some embodiments of this disclosure.

FIG. 3 shows a block diagram 300 of an illustrative system for receiving a content recommendation from a first content provider, based on a token stored in a distributed ledger and recovered by the first content provider, in accordance with some embodiments of this disclosure. As shown in FIG. 3, the data control application may receive input from user 302 to select media listing 332 representing a particular content item (e.g., "The Dark Knight" provided by the content provider Netflix), and proceed to consume at least a portion of the content item. At 324, the data control application may generate a token based on the monitored consumption of the content item "The Dark Knight" and demographic data of user 302. For example, the data control application may receive various attributes of the content item from the content provider and retrieve demographic data from a user profile of user 302. Such data 326 may be converted by the data control application to a token comprising an alphanumeric string representative of data 326 using any suitable algorithm or technique. The token may comprise an identifier or pointer that may be used to retrieve data 326 or may contain or embed data 326 itself.

At 334, the data control application may, based on selections received from user 302 (e.g., via GUI 100 of FIG. 1A), determine that a first content provider (e.g., Hulu) should be granted access to token 328, but a second content provider (e.g., Amazon Prime) should not be granted access to token 328. In some embodiments, the data control application may generate, at 336, digital currency or cryptocurrency based on user 302 granting the second content provider access to token 328, representing data 326 of one or more attributes of the consumed content item and demographic data of user 302. The data control application may cause a record of currency transfers to be stored at distributed ledger 201, such as, for example, as a new record in distributed ledger 201 or an existing record in distributed ledger 200 may be modified to reflect the digital currency transfer or transaction. The digital currency may be redeemable by user 302 to access certain content that user 302 otherwise is not able to access. In some embodiments, the data control application may provide user 302 with the digital currency as a function of how many providers user 302 grants access to his or her data, to incentivize user 302 to provide his or her data to multiple content providers. The generation of the digital currency, which may be referred to herein as "media coins" and awarding of media coins to user 302 may be tracked by distributed ledger 200, e.g., the transaction may be recorded as part of token 328 or the data control application may generate a new token based on the generated media coins. In some embodiments, distributed ledger 200 may enable user devise of users who are part of the community of distributed ledger 200 to transfer one or more media coins to each other (e.g., by adding entries to distributed ledger 200 based on the transfer), and distributed ledger 200 may store indications of these transactions therein. In some embodiments, redemptions or purchases of content using the media coins may be stored at distributed ledger 200.

At 338, token 328 may be converted into a particular format, e.g., encrypted using a public key-private key pair. For example, the data control application may encrypt token 328 using public key 340 associated with the first content provider (e.g., Amazon Prime). While public key 340 may be publicly accessible, only the first content provider may have access to private key 344 that is required to decrypt token 328 encrypted via public key 340, and private key 344 is not exposed to other parties. In some embodiments, a random or pseudorandom technique may be employed to generate the public-private-key pair, which may be generated by the data control application in combination with the first content provider. For example, one or more of the RSA asymmetric encryption algorithm, or the ECC asymmetric encryption algorithm may be employed to generate the public-private-key pair. In some embodiments, each of public key 340 and private key 344 may be associated with an expiration date indicating that the public-private key pair expires after a predetermined period of time (e.g., one week), thereby necessitating the generation of a new public-private key pair when the time period expires, which may be performed automatically or at the request of user 302.

Data associated with token 328 converted to the particular format at 338 may then be started as a new block at distributed ledger 200. The new block may then be propagated to other members of the community 202-212. In some embodiments, the new block may be verified by consensus of the community (e.g., by checking the correctness of a hash chain of distributed ledger 200). In response to the new block being verified, the new block may be added to all local copies of the blockchain by members of the community 202-212. Operation of system 200 aims to build trust between users and content providers and promote convenient and secure delivery of tokens in the community.

At 342, first content provider 346 may utilize private key 344 associated with first content provider 346 to token 328 encrypted at 338, in order to provide user 302 with tailored content recommendations based on data 326 represented by token 328. On the other hand, second content provider 348 is not able to access encrypted token 328, since private key 350 associated with second content provider 348 is not able to decrypt encrypted token 328 intended for first content provider 346. In some embodiments, the data control application enables user 302 to deregister from a specific content provider by enabling user 302 to change a public key without notifying the content provider, thereby unlinking consumption data of user 302 from the content provider.

Figure 4:
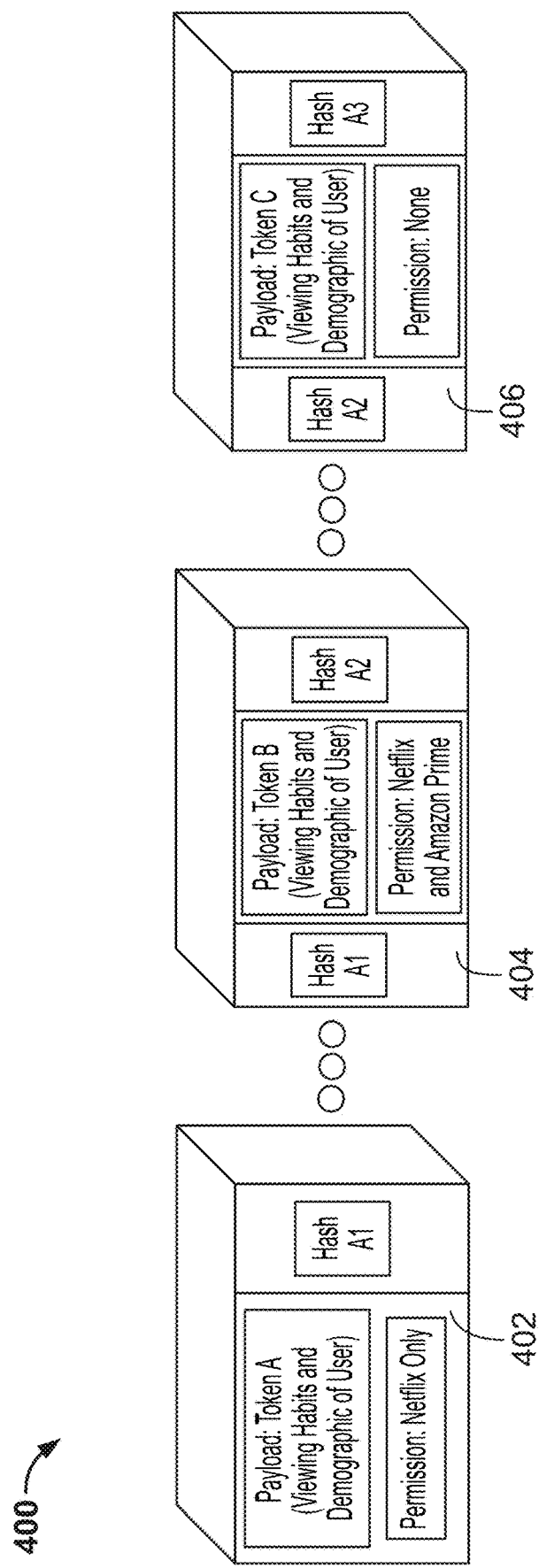
FIG. 4 shows a block diagram of an illustrative example of a distributed blockchain ledger, in accordance with some embodiments of this disclosure.

FIG. 4 shows a block diagram of an illustrative example of a distributed ledger 400, in accordance with some embodiments of this disclosure. Distributed ledger 400 may correspond to distributed ledger 200 of FIGS. 2-3. While only three blocks are shown, one of ordinary skill in the art would appreciate that any number of blocks may be stored at distributed ledger 400. Distributed ledger 400 may be used to store encrypted tokens representing an attribute of a content item consumed by a user (e.g., user 302 of FIG. 3) at a user device (e.g., user equipment 322 of FIG. 3) and demographic data associated with such user. For example, block 402 may include a payload that comprises an encrypted token (e.g., encrypted based on a public-private-key pair) generated based on first content consumed by user 302, as well as an indication as to which content providers are to be granted access to the token (e.g., Netflix only). Block 402 may include a hash A1 generated based on the entirety of payload of block 402. The hash may be calculated by applying a hash function or hash algorithm (e.g., Secure Hash Algorithms, such as, for example, SHA-1, SHA-2, SHA-256) to all of the data associated with the block, where such computed hashes are deterministic and impractical to reverse.

Block 404 may include hash A1 (e.g., the same hash as hash A1 of block 402) and a payload that includes an encrypted token generated based on second content consumed by user 302, as well as an indication as to which content providers are to be granted access to the token (e.g., Netflix and Amazon Prime). Block 404 may further include a hash A3 that is based on the entirety of payload of block 404 and on hash A1. Block 406 may include hash A2 (e.g., the same hash as hash A2 of block 404) and a payload that includes an encrypted token generated based on third content consumed by user 302, as well as an indication as to which content providers are to be granted access to the token (e.g., none). Block 406 may further include a hash A3 that is based on the entirety of payload of block 404 and on hash A2. In some embodiments, the data control application may enable user 302 to reset the hash chain if the user notices any of his or her data being misused.

The chaining of hashes as described above ensures that the blockchain cannot be modified by any entity, as other entities will be able to recompute hashes and verify that all hashes in the blockchain are correct. For example, if any payload is tampered with, a correct hash would not be computed based on the tempered payload, leading to the discovery of the tampering.

Figure 5:
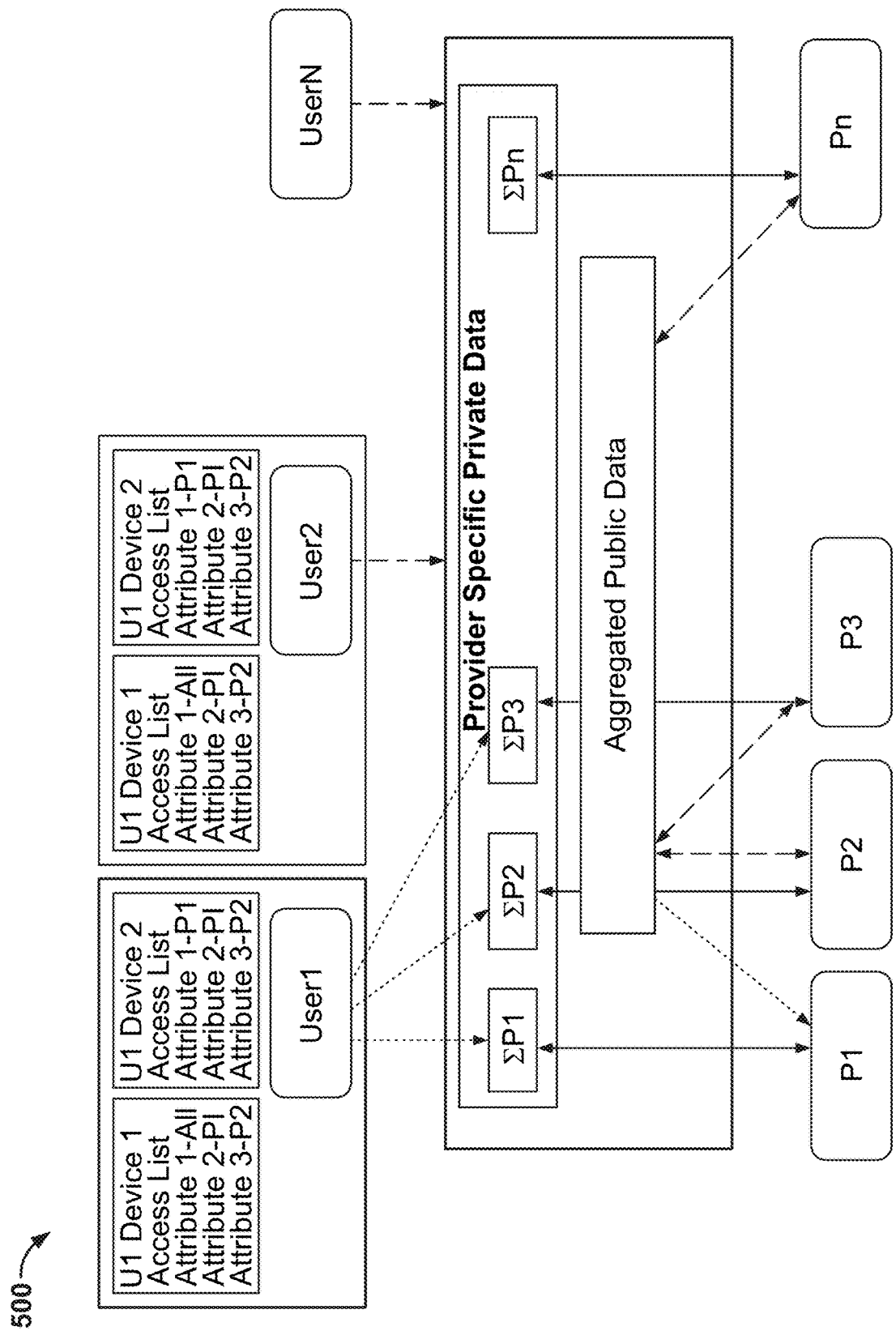
FIG. 5 shows a block diagram of an illustrative system for determining which data to provide to content providers, in accordance with some embodiments of this disclosure.

FIG. 5 shows a block diagram of an illustrative system for determining which data to provide to content providers, in accordance with some embodiments of this disclosure. As shown in FIG. 5, various users (e.g., User 1, User 2 . . . User N) may designate certain content consumption attributes as public (e.g., so that such data is stored unencrypted on distributed ledger 200) or private (e.g., giving only specific providers access to the data by way of a public-private key pair). The data control application may receive an indication from the user that all his or her data is public, all of his or her data should be private, or a combination thereof. In some embodiments, content providers P1, P2, P3 . . . Pn may have access to an aggregated pool of public data of all users (e.g., data that such users designated as public), where such data is anonymized, for use in generating content recommendations.

Figure 6:
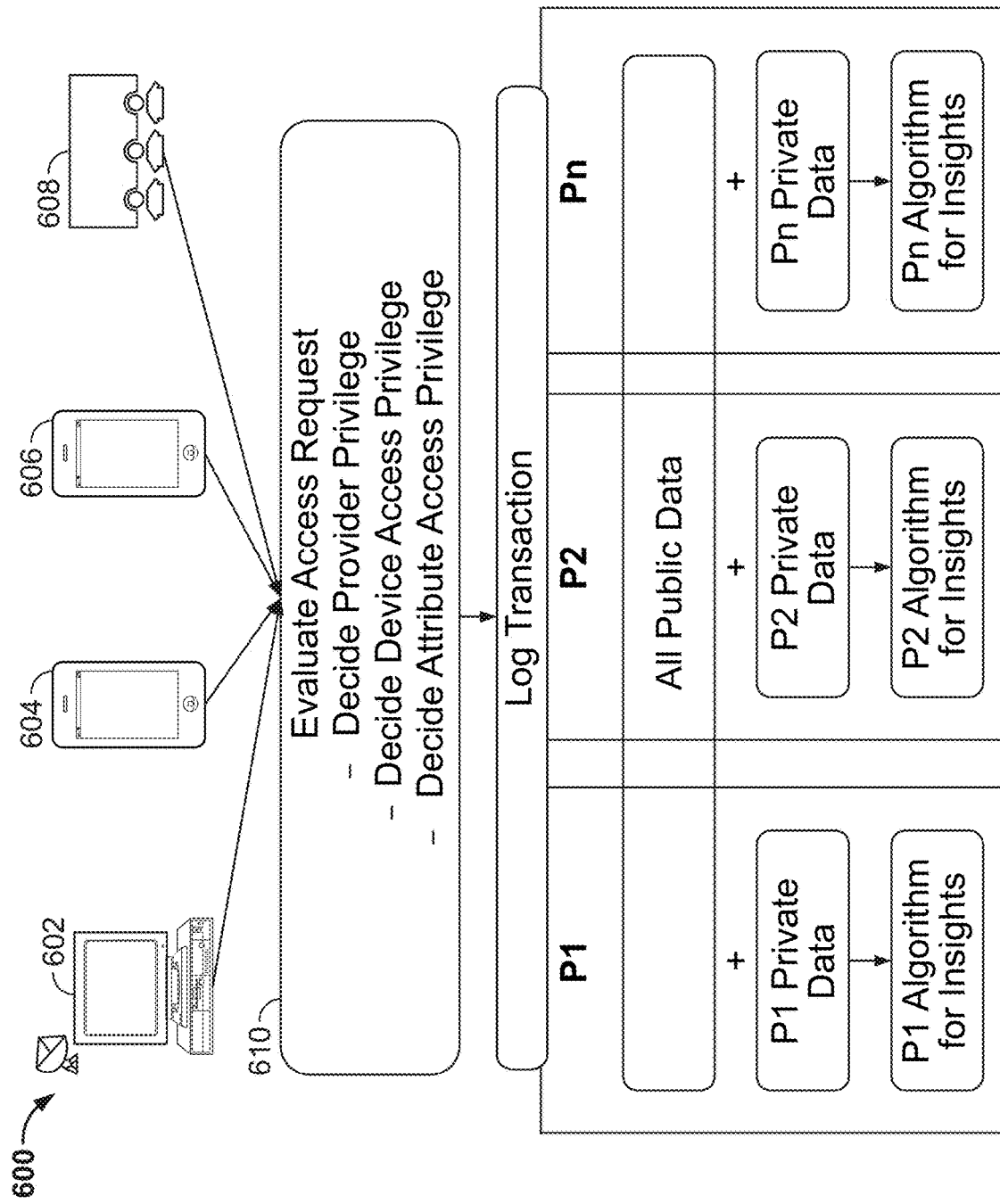
FIG. 6 shows a block diagram of an illustrative system for determining which data to provide to content providers, in accordance with some embodiments of this disclosure.

FIG. 6 shows a block diagram of an illustrative system for determining which data to provide to content providers, in accordance with some embodiments of this disclosure. As shown in FIG. 6, at 610 the data control application may evaluate which content providers P1, P2, P3 are permitted to access encrypted tokens associated with users of one or more of user devices 602, 604, 606, 608, as stored at distributed ledger 200. As shown, each content provider may have access to the aggregated public data pool (e.g., anonymized data to remove personally identifiable information of users) as well as certain private data (e.g., certain data that users of user devices 602, 604, 606, 608 granted the respective content provider access to). Thus, each of user devices 602, 604, 606, 608 may receive content recommendations from content providers P1, P2, P3 based on the aggregated pool of public data as well as certain private data that is encrypted but available for certain content providers on distributed ledger 200 (e.g., recoverable via a public-private key pair of FIG. 4).

Figure 7:
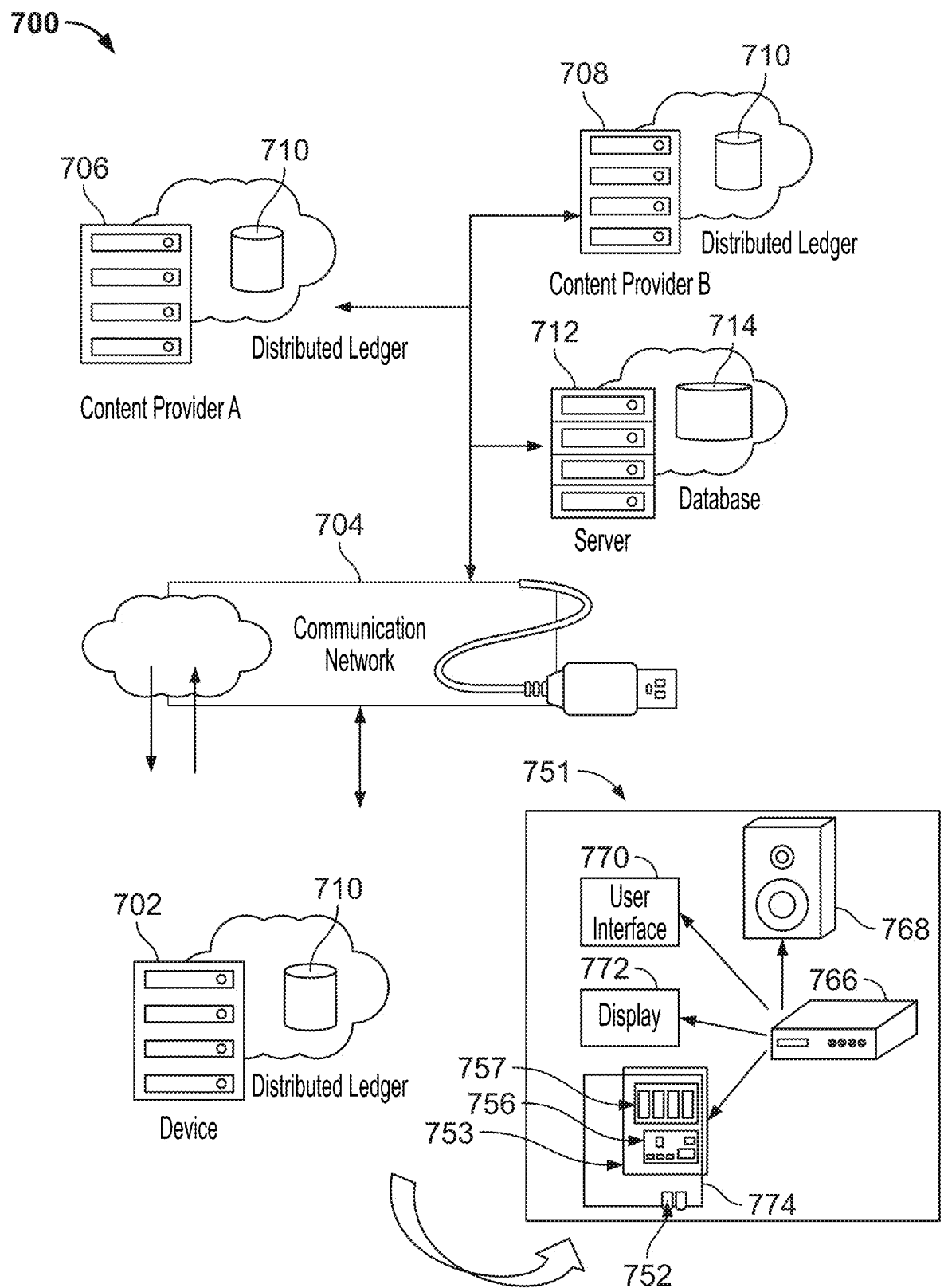
FIG. 7 is a block diagram of an illustrative data control system, in accordance with some embodiments of this disclosure.

FIG. 7 is a block diagram of an illustrative data control system 700, in accordance with some embodiments of this disclosure. Data control system 700 may comprise any number of devices, servers and databases. Device 702 may be coupled to communication network 704. Device 702 may be any type of a computing device, such as, for example, a server, a desktop, a tablet, a smartphone, any other computing device or any combination thereof. Communication network 704 may be one or more networks including the Internet, a mobile phone network, mobile voice or data network (e.g., a 4G or LTE network), cable network, public switched telephone network, or other types of communication network or combinations of communication networks. Each of device 702, content provider 706 (e.g., one or more servers and/or databases of a first content provider), content provider 708 (e.g., one or more servers and/or databases of a second content provider), server 712 (e.g., on which the data control application may be configured to implemented at least in part, and associated with database 720 which may store the database records discussed in connection with FIG. 1) may be connected to communication path 704 via one or more communication paths, such as, for example, a satellite path, a fiber-optic path, a cable path, a path that supports Internet communication (e.g., IPTV), free-space connections (e.g., for broadcast or other wireless signals), or any other suitable wired or wireless communication path or combination of such paths.

Although communication paths are not drawn between device 702, content provider 706, content provider 708 and server 712, these devices may communicate directly with each other via communication paths, such as short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The media devices may also communicate with each other directly through an indirect path via communication network 704.

System 700 includes content provider 706 and content provider 708 coupled to communication network 704. There may be any number of content providers coupled to communication network 704, but only two are shown in FIG. 7 to avoid overcomplicating the drawing. Content providers 706, 708 may include one or more types of content distribution equipment including a television distribution facility, cable system headend, satellite distribution facility, programming sources (e.g., television broadcasters, etc.), intermediate distribution facilities and/or servers, Internet providers, on-demand media servers, and other content providers. Content providers 706, 708 may comprise one or more servers of a content creator. For example, content providers 706, 708 may store newly created or old media content and accompanying attributes and metadata, and other data (e.g., demographic data and viewing patterns of subscribers).

The data control application may be, for example, a stand-alone application implemented on one or more of device 702, content provider 706, content provider 708, data control server 712. For example, a data control application may be implemented as software or a set of executable instructions which may be stored in storage 757 and executed by control circuitry 753 of a device 702, content provider server 706, content provider server 708, or data control server 712. When executed by such control circuitry, the data control application may instruct control circuitry 7537 to perform data control functionality, encryption functionality, and/or blockchain creation, transfer, and storage functionality described above and below. In some embodiments, any one of device 702, content provider 706, content provider 708, data control server 712 may include the hardware and software needed to operate a distributed ledger 710 (which may correspond to distributed ledger 201 of FIG. 2) storage and access functionalities configured as described above or below. For example, each of device 702, content provider 706, content provider 708, data control server 712 may store a copy of distributed ledger 710. In some embodiments, updates to the distributed ledger 710 may be distributed via network 704.

Device 702 may include elements of a computer device 751. In some embodiments, content provider 706, content provider 708, data control server 712 may also include some or all elements described in relation to device 702. As depicted, computer device 751 may be any computer system powered by processor 774. Computer device 751 may receive content and data via input/output (hereinafter "I/O") path, which may comprise I/O circuitry. The I/O path may send database records, distributed ledger blocks, and other data to control circuitry 753, which includes processing circuitry 756 and storage 757. Control circuitry 753 may be used to send and receive commands, requests, and other suitable data using the I/O path. The I/O path may connect control circuitry 753 (and specifically processing circuitry 756) to one or more communication paths (described below). I/O functions may be provided by one or more of these communication paths.

Control circuitry 753 may be based on any suitable processing circuitry such as processing circuitry 756. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). Processing circuitry 756 may include display generation circuitry. Display generation circuitry may include display generation functionalities that enable generations for display 772. In some embodiments, control circuitry 753 executes instructions for a user equipment device and/or application stored in memory (i.e., storage 757). Specifically, control circuitry 753 may be instructed by a user equipment device and/or application to perform the functions discussed above and below.

Device 702 may operate in a cloud computing environment to access cloud services. In a cloud computing environment, various types of computing services for content sharing, storage or distribution (e.g., audio sharing sites or social networking sites) are provided by a collection of network-accessible computing and storage resources, referred to as "the cloud." Cloud resources may be accessed by device 702 using, for example, a web browser, a data control application, a desktop application, a mobile application, and/or any combination of the above. Device 702 may be a cloud client that relies on cloud computing for application delivery, or the media device may have some functionality without access to cloud resources. For example, some applications running on device 702 may be cloud applications, i.e., applications delivered as a service over the Internet, while other applications may be stored and run on the media device. In some embodiments, a user device may receive content from multiple cloud resources simultaneously. In some embodiments, media devices can use cloud resources for processing operations such as the processing operations performed by processing circuitry. In some embodiments, content provider 706, 708 and server 712 may also be a part of a cloud computing environment. For example, device 702 may access one or both of content provider 706, 708 via a cloud service. In such client/server-based embodiments, control circuitry 753 may include communication circuitry suitable for communicating with one or both of content provider 706, 708. Communication circuitry may include a cable modem, an integrated services digital network (ISDN) modem, a digital subscriber line (DSL) modem, a telephone modem, an Ethernet card, or a wireless modem for communication with other equipment, or any other suitable communication circuitry. Such communication may involve the Internet or any other suitable communication networks or paths. In addition, communication circuitry may include circuitry that enables peer-to-peer communication of media devices, or communication of media devices in locations remote from each other.

Memory may be an electronic storage device provided as storage 757, which may be part of control circuitry 753. As referred to herein, the phrase "electronic storage device" or "storage device" should be understood to mean any device for storing electronic data, computer software, or firmware, such as random-access memory, hard drives, optical drives, solid state devices, quantum storage devices, gaming consoles, gaming media, or any other suitable fixed or removable storage devices, and/or any combination of the same. Nonvolatile memory may also be used (e.g., to launch a boot-up routine and other instructions). Cloud-based storage may be used to supplement storage 757, or instead of storage 757.

A user, or another system, may send instructions to control circuitry 753 using user input interface 770 of computer device 751. User input interface 770 may be any suitable user interface, such as a remote control, mouse, trackball, keypad, keyboard, touchscreen, touchpad, stylus input, joystick, voice recognition interface, or other user input interfaces. Display 772 may be a touchscreen or touch-sensitive display. In such circumstances, user input interface 770 may be integrated with or combined with display 772. Display 772 may be provided as a stand-alone device or integrated with other elements of computer device 751. Speakers 768 may be provided as integrated with other elements of computer device 751. The audio component of videos and other content displayed on display 772 may be played through speakers 768. In some embodiments, the audio may be distributed to a receiver (not shown), which processes and outputs the audio via speakers 768. In some embodiments, device 751 may include input/outputs other than the user input interface, such as network interface or cloud interface. In one implementation, device 751 may only include input/outputs other than the user input interface and lack may any kind of direct input interface 760.

Figure 8:
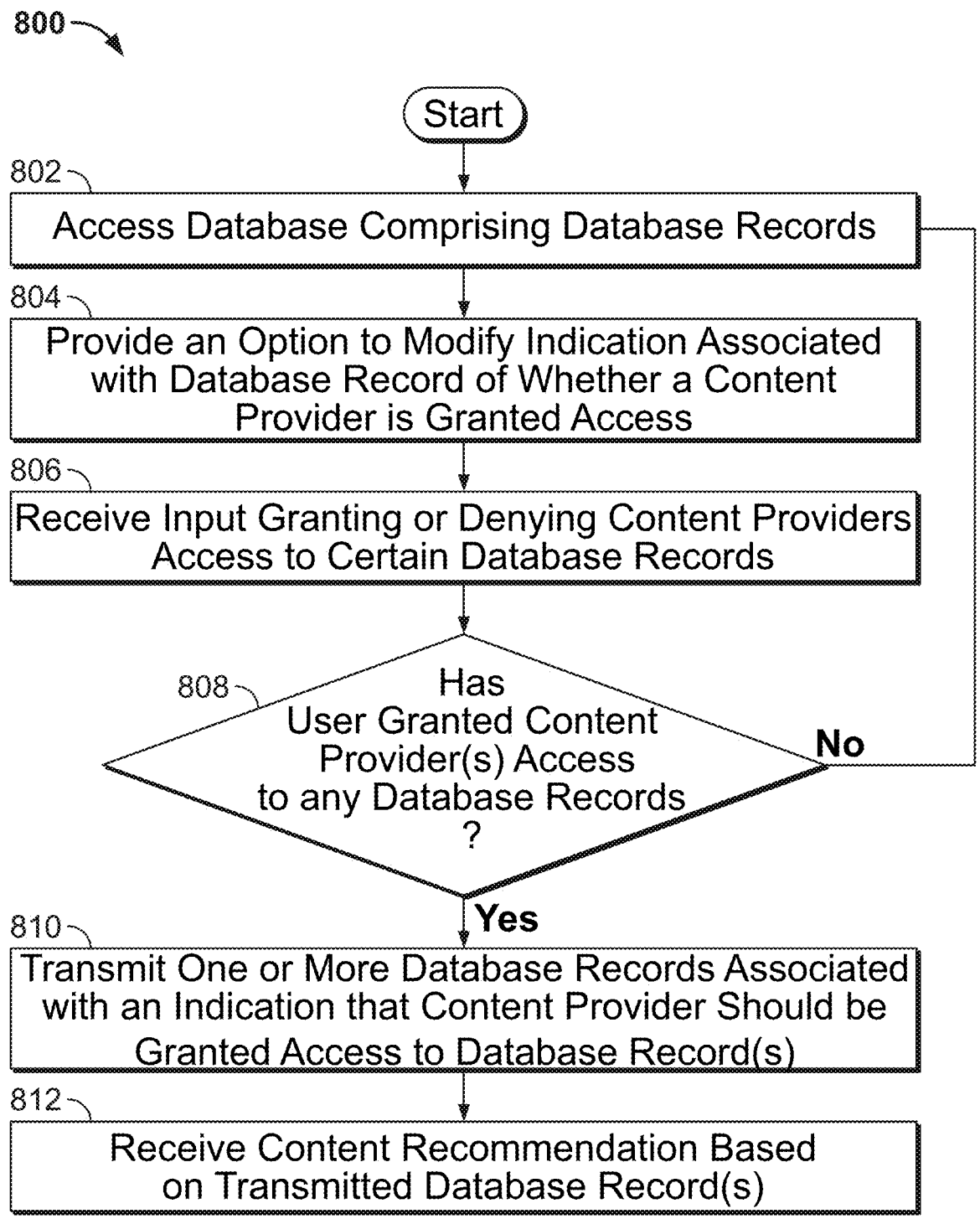
FIG. 8 is a flowchart of a detailed illustrative process for enabling a user to modify database records, each comprising an attribute of a content item consumed by a user and an indication of a user device used by the user to consume the content item, in accordance with some embodiments of this disclosure.

FIG. 8 is a flowchart of a detailed illustrative process for enabling a user to modify database records, each comprising an attribute of a content item consumed by a user and an indication of a user device used by the user to consume the content item, in accordance with some embodiments of this disclosure. In various embodiments, the individual steps of process 800 may be implemented by one or more components of the devices and systems of FIGS. 1-7. Although the present disclosure may describe certain steps of process 800 (and of other processes described herein) as being implemented by certain components of the devices and systems of FIGS. 1-7, this is for purposes of illustration only, and it should be understood that other components of the devices and systems of FIGS. 1-7 may implement those steps instead. For example, the steps of process 800 may be executed at device 702 and/or server 712 of FIG. 7.

At 802, control circuitry 753 (e.g., of device 702 and/or server 712) may access a database (e.g., database 714 of FIG. 7) storing a plurality of database records (e.g., corresponding to 104, 106, 108, 110 depicted in GUI 100 of FIG. 1A). Each database record comprises an attribute (e.g., the title "Mad Men" consumed by user 102 of database record 104) of a content item consumed by a user (e.g., user 102) and an indication of a user device (e.g., smart television 122 of FIG. 1B) used by user 102 to consume the content item. In addition, each database record comprises or is otherwise associated with an indication of whether a content provider should be granted access to the respective database record, such as based on user selections made at 802.

At 804, control circuitry 753 (e.g., of device 702 and/or server 712) may provide (e.g., via GUI 100 of FIG. 1A) one or more options to modify indications associated with a database record (e.g., database record 104) of whether a particular content provider is granted access. At 806, control circuitry 753 (e.g., of device 702 and/or server 712) may receive input from a user (e.g., user 102) granting or denying content providers access to certain database records (e.g., corresponding to 104, 106, 108, 110 depicted in GUI 100 of FIG. 1A) or portions thereof. For example, control circuitry 753 may receive from user 102 selection (e.g., of a checkmark) in column 116 of GUI 100 of FIG. 1A an indication to grant or revoke access to a particular database record (e.g., to grant access to content provider 116 to the attribute of the title "Mad Men" consumed on a particular device). In some embodiments, control circuitry 753 may receive selection from user 102 to grant certain content providers access to all or none of a particular attribute, or to grant all content providers access to all or none of a particular attribute, or to grant certain content providers access to data associated with content items consumed on a particular user device.

At 808, control circuitry 753 (e.g., of device 702 and/or server 712) may determine whether user 102 has granted one or more content providers access to any database records or portions thereof. In the example of FIG. 1, control circuitry 753 may determine that, for database record 104, content provider 116 is granted access to the "Mad Men" title attribute for the purposes of generating content recommendations for Device 1 and Device 3, but has not granted access to content provider 116 to "Mad Men" title attribute for the purposes of generating content recommendations for Device 2. Such attribute may also be associated with an indication of a device used to consume the content. In some embodiments, the indication of the device used to consume the content may be used by content providers to better tailor recommendations. Such indication may be determined based on a device identifier associated with the user device and transmitted to the content provider and/or data control server (e.g., server 712 of FIG. 7).

At 810, control circuitry 753 (e.g., of device 702 and/or server 712) may transmit one or more database records (e.g., portions of database records 104, 108, 110) to a particular content provider (e.g., content provider 116) associated with an indication that content provider should be granted access to database records. In some embodiments, control circuitry 753 may determine that the content provider already had access to, and likely stored, certain of such database records, and may only transmit the database records that the content provider has not yet been provided with.

At 812, control circuitry 753 (e.g., of device 702 and/or server 712) may receive a content recommendation from one or more of the content providers (e.g., content provider 116) based on the transmitted database records. In this way, the data control application permits a user to selectively specify which portions of his or her consumption history may be used by content providers in tailoring media recommendations.

Figure 9:
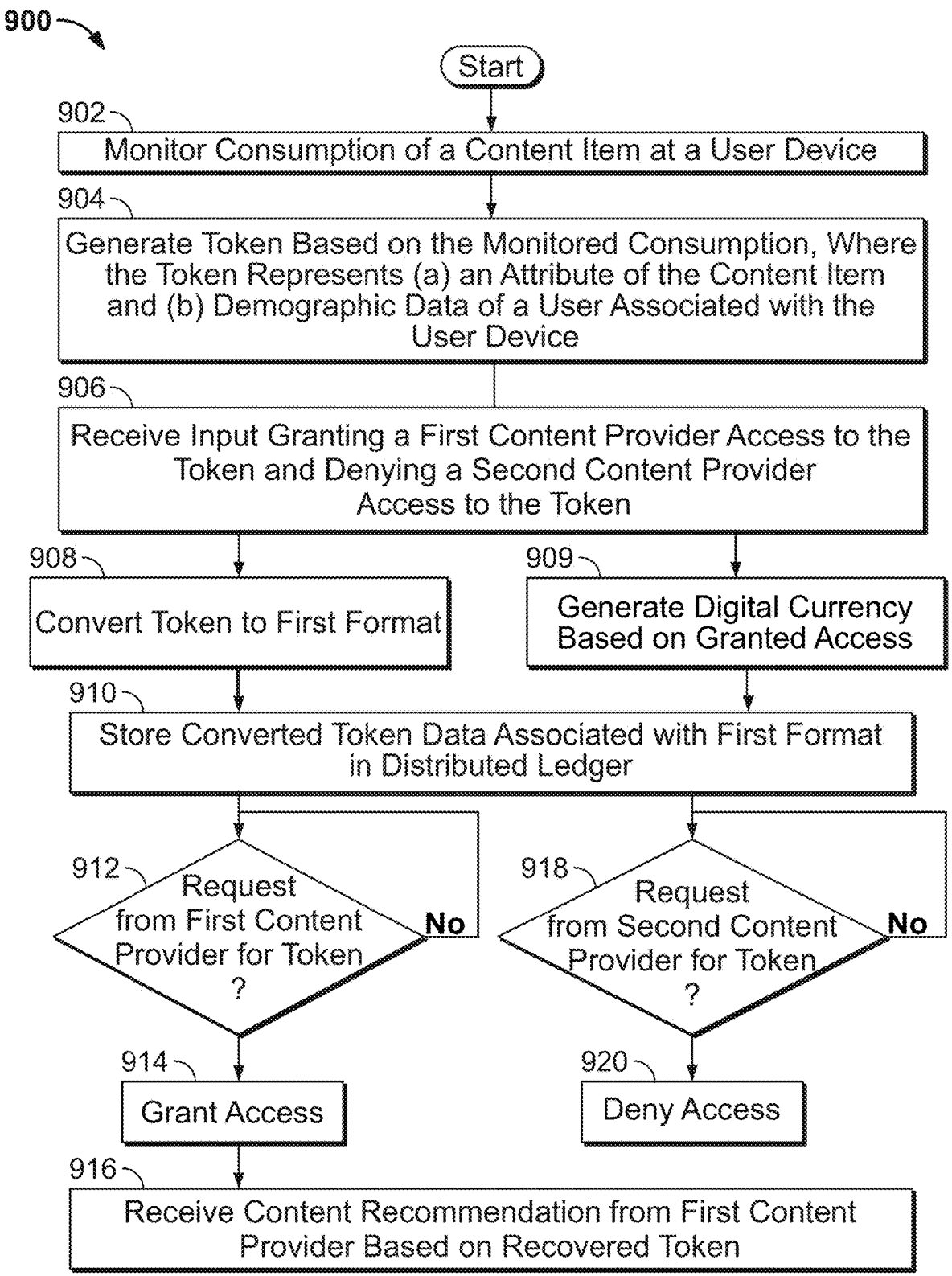
FIG. 9 is a flowchart of a detailed illustrative process for storing converted token data associated with a first format in a distributed ledger, and receiving a content recommendation from a first content provider, based on the token recovered by the first content provider, in accordance with some embodiments of this disclosure.

FIG. 9 is a flowchart of a detailed illustrative process for storing converted token data associated with a first format in a distributed ledger, and receiving a content recommendation from a first content provider, based on the token recovered by the first content provider, in accordance with some embodiments of this disclosure. In various embodiments, the individual steps of process 900 may be implemented by one or more components of the devices and systems of FIGS. 1-7. Although the present disclosure may describe certain steps of process 600 (and of other processes described herein) as being implemented by certain components of the devices and systems of FIGS. 1-7, this is for purposes of illustration only, and it should be understood that other components of the devices and systems of FIGS. 1-7 may implement those steps instead. For example, the steps of process 900 may be executed at device 702 and/or server 712 of FIG. 7.

At 902, control circuitry 753 (e.g., of device 702 and/or server 712 and/or content providers 706, 708) may monitor consumption of a content item at a user device (e.g., device 702 of FIG. 7). For example, control circuitry 753 may determine that a user (e.g., user 302 of FIG. 3) has consumed a content item (e.g., "The Dark Knight" associated with the media listing 332 of FIG. 3) at a user device (e.g., user device 322).

At 904, control circuitry 753 may generate a token based on the monitored consumption, where the token represents an attribute of the content item (e.g., title, genre, time stamp, device, as shown at 326 of FIG. 3) and demographic data (e.g., male, 30s, NYC) of user 302 associated with user device 322. In some embodiments, the token (e.g., token 328 of FIG. 3) may comprise an alphanumeric string representing the attributes of the content item and the demographic data of the user having consumed the content item.

At 906, control circuitry 753 may receive input granting a first content provider access to the token and denying a second content provider access to the token. Such step 906 may be performed in a similar manner as 806 of FIG. 8, e.g., by way of GUI 100 of FIG. 1. For example, control circuitry 753 may receive an indication to grant first content provider 346 access to the token but deny second content provider 348 access to the token. In some embodiments, control circuitry 753 may receive input to provide data 326 to any combination of content providers, and/or to revoke access to certain data 326 for certain content providers or all content providers.

At 908, control circuitry 753 (e.g., of device 702 and/or server 712) may convert the token (e.g., token 328 of FIG. 3) to a first format, such that the token may be stored at a distributed ledger (e.g., distributed ledger 200 of FIG. 2) while at the same time restricting access to only approved content providers. Control circuitry 753 may utilize public-private-key pair 340, 344 to encrypt token 328 to be stored at the distributed ledger, where public key 340 may be used to encrypt token 328, and content provider 346 having been granted access to token 328 is capable of recovering token 328 by way of private key 344, whereas content provider 334 having been denied access to token 328 is not able to recover token 328.

At 909, control circuitry 753 may generate digital currency (e.g., such as at 336 of FIG. 3) in response to determining that the user has granted certain content providers access to consumption data. Such digital currency may be redeemable by the user to purchase or access certain content that the user may not otherwise have access to, and may be transferable to a device of other users also part of the community of distributed ledger 200. In some embodiments, the token may be modified to indicate that user 302 has been granted digital currency, or a new token may be generated by control circuitry 753 as part of a block stored at distributed ledger 200, to enable tracking of the digital currency including subsequent purchases using the digital currency or transfers of the digital currency.

At 910, control circuitry 753 may store the converted token (e.g., encrypted with a public key of a first content provider) to obtain converted token data, and store such converted token data in distributed ledger 200. Such token may be stored in a block at distributed ledger 200 (e.g., as part of block 402 of FIG. 4).

At 912, control circuitry 753 may determine whether a first content provider (e.g., content provider 346) has requested access to the token, such as for the purposes of generating content recommendations for the user.

At 914, control circuitry 753 may grant access to the token stored on the distributed ledger, based on the first content provider having access to a private key (e.g., private key 344) to decrypt token 328 having been encrypted with public key 340 of the first content provider 346.

At 916, control circuitry 753 may receive one or more content recommendations from the first content provider (e.g., content provider 346) having been granted access to the token based on recovering such token by way of the private key of the first content provider. In some embodiments, a predetermined time period may be associated with the private-public key pair, such that the private-public key pair expires.

At 918, control circuitry 753 may control circuitry 753 may determine whether a first content provider (e.g., content provider 346) has requested access to the token, such as for the purposes of generating content recommendations for the user.

At 920, control circuitry 753 may deny access to the token stored on the distributed ledger, based on the second content provider not having access to a private key (e.g., private key 344) to decrypt token 328 having been encrypted with public key 340 of the first content provider 346.

The processes discussed above are intended to be illustrative and not limiting. One skilled in the art would appreciate that the steps of the processes discussed herein may be omitted, modified, combined and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method comprising:
    accessing a database comprising a plurality of database records, wherein each database record is associated with a user profile and:
        comprises (a) an attribute of a content item consumed by a user of the user profile and (b) an indication of a user device, of a plurality of user devices associated with the user profile, used by the user to consume the content item; and
        is associated with an indication of whether a content provider should be granted access to the respective database record to enable the content provider to generate, based on the respective database record, a content recommendation for a respective user device of the plurality of user devices;
    generating for simultaneous display, for each respective database record of the plurality of database records, a plurality of options respectively corresponding to the plurality of user devices associated with the user profile, to modify whether or not the content provider should be granted access to the respective database record to enable the content provider to generate, based on the respective database record, a content recommendation for a respective user device of the plurality of user devices;
    identifying one or more database records of the plurality of database records for which a particular option of the plurality of options, corresponding to a particular device of the plurality of devices, is associated with an indication that the content provider should be granted access to the one or more database records to enable the content provider to generate, based on the one or more database records, a content recommendation for the particular user device; and
    transmitting to the content provider the one or more identified database records, to enable the content provider to generate and transmit a content recommendation to the particular user device based on the one or more identified database records transmitted to the content provider.

2. The method of claim 1, wherein the attribute comprises one or more of a title of the content item, a genre of the content item, a microgenre of the content item, a time stamp associated with the consumption of the content item, content provider information associated with the content item, artist information associated with the content item, and a device profile of the user device used to consume the content item.

3. The method of claim 1, further comprising:
    in response to receiving a request from the user to share user preferences with the content provider:
        performing the transmitting to the content provider of the identified one or more database records; and
        refraining from transmitting database records without the respective option being associated with the indication that the content provider should be granted access.

4. The method of claim 1, wherein a database record of the plurality of database records comprises an indication that a first content provider should be granted access to the database record and an indication that a second content provider should not be granted access to the database record.

5. The method of claim 1, wherein the content recommendation from the content provider is received in response to a search query input by the user, the content recommendation comprising promoting a rank of content items returned in response to the search query based on the identified one or more database records transmitted to the content provider.

6. The method of claim 1, wherein the content recommendation received from the content provider is generated based on the particular user device being used by the user and the one of more identified database records transmitted to the content provider associated with the particular user device.

7. The method of claim 1, wherein generating for display, for each database record of the plurality of database records, the plurality of options to modify whether or not the content provider should be granted access to the respective database record comprises:
    generating for display a graphical user interface comprising the plurality of options and an additional option to delete one or more of the plurality of database records in relation to the content provider.

8. The method of claim 1, wherein generating for display, for each database record of the plurality of database records, the plurality of options to modify whether or not the content provider should be granted access to the respective database record comprises:

generating for display a graphical user interface comprising the plurality of options and an additional option to deny a particular content provider access to each of the database records associated with the user profile.

9. The method of claim 1, wherein generating for display, for each database record of the plurality of database records, the plurality of options to modify whether or not the content provider should be granted access to the respective database record comprises:

generating for display a graphical user interface comprising in tabular form the plurality of database records to the user along with a respective option, of the plurality of options, for each respective database record to modify whether or not the content provider should be granted access to the respective database record.

10. The method of claim 1, wherein:
the particular user device is a first device of the plurality of devices, the plurality of devices comprising a second device different from the first device;
the plurality of options correspond to a first plurality of options, and the particular option is a first option;
the content provider is a first content provider, and the content recommendation is a first content recommendation;
each database record of the plurality of database records is further associated with an indication of whether a second content provider should be granted access to the respective database record to enable the second content provider to generate, based on the respective database record, a second content recommendation for a respective user device of the plurality of user devices; and
the method further comprises:
generating for simultaneous display with the first plurality of options, for each respective database record of the plurality of database records, a second plurality of options respectively corresponding to the plurality of user devices associated with the user profile, to modify whether or not the second content provider should be granted access to the respective database record to enable the second content provider to generate, based on the respective database record, the second content recommendation for a respective user device of the plurality of user devices;
identifying at least one database record of the plurality of database records for which a second option of the plurality of options, corresponding to a second device of the plurality of devices, is associated with an indication that the second content provider should be granted access to the one or more database records to enable the second content provider to generate, based on the one or more database records, the second content recommendation for the second user device; and
transmitting to the second content provider the at least one identified database record, to enable the second content provider to generate and transmit the second content recommendation to the second user device based on the at least one identified database record transmitted to the second content provider.

11. The method of claim 1, wherein:
the content provider is a first content provider, and the content recommendation is a first content recommendation;
the plurality of options correspond to a first plurality of options, and the particular option is a first option;
the one or more identified database records comprise a particular database record;
each database record of the plurality of database records is further associated with an indication of whether a second content provider should be granted access to the respective database record to enable the second content provider to generate, based on the respective database record, a second content recommendation for a respective user device of the plurality of user devices; and
the method further comprises:
generating for simultaneous display with the first plurality of options, for each respective database record of the plurality of database records, a second plurality of options respectively corresponding to the plurality of user devices associated with the user profile, to modify whether or not the second content provider should be granted access to the respective database record to enable the second content provider to generate, based on the respective database record, the second content recommendation for a respective user device of the plurality of user devices; and
for the particular database record:
determining that a second option of the second plurality of options, corresponding to the particular device, is not associated with an indication that the second content provider should be granted access to the particular database record; and
declining to transmit the particular database record to the second content provider, to prevent the second content provider from generating and transmitting the second content recommendation to the particular user device based on the particular database record.

12. A system comprising:
a database; and
control circuitry configured to:
access the database comprising a plurality of database records, wherein each database record is associated with a user profile and:
comprises (a) an attribute of a content item consumed by a user of the user profile and (b) an indication of a user device, of a plurality of user devices associated with the user profile, used by the user to consume the content item; and
is associated with an indication of whether a content provider should be granted access to the respective database record to enable the content provider to generate, based on the respective database record, a content recommendation for a respective user device of the plurality of user devices; and
generate for simultaneous display, for each respective database record of the plurality of database records, a plurality of options respectively corresponding to the plurality of user devices associated with the user profile, to modify whether or not the content provider should be granted access to the respective database record to enable the content provider to generate, based on the respective database record, a content recommendation for a respective user device of the plurality of user devices;
identify one or more database records of the plurality of database records for which a particular option of the plurality of options, corresponding to a particular device of the plurality of devices, is associated with an indication that the content provider should be granted access to the one or more database records to enable the content provider to generate, based on the one or more database records, a content recommendation for the particular user device; and transmit to the content provider the one or more identified database records, to enable the content provider to generate and transmit a content recommendation to the particular user device based on the one or more identified database records transmitted to the content provider.

13. The system of claim 12, wherein the attribute comprises one or more of a title of the content item, a genre of the content item, a microgenre of the content item, a time stamp associated with the consumption of the content item, content provider information associated with the content item, artist information associated with the content item, and a device profile of the user device used to consume the content item.

14. The system of claim 12, wherein the control circuitry is further configured to:

in response to receiving a request from the user to share user preferences with the content provider:

perform the transmitting to the content provider of the identified one or more database records; and refrain from transmitting database records without the respective option being associated with the indication that the content provider should be granted access.

15. The system of claim 12, wherein a database record of the plurality of database records comprises an indication that a first content provider should be granted access to the database record and an indication that a second content provider should not be granted access to the database record.

16. The system of claim 12, wherein the control circuitry is configured to receive the content recommendation from the content provider in response to a search query input by the user, the content recommendation comprising promoting a rank of content items returned in response to the search query based on the identified one or more database records transmitted to the content provider.

17. The system of claim 12, wherein the content recommendation received from the content provider is generated based on the particular user device being used by the user and the one of more identified database records transmitted to the content provider associated with the particular user device.

18. The system of claim 12, wherein the control circuitry is configured to generate for display, for each database record of the plurality of database records, the plurality of options to modify whether or not the content provider should be granted access to the respective database record by:

generating for display a graphical user interface comprising the plurality of options and an additional option to delete one or more of the plurality of database records in relation to the content provider.

19. The system of claim 1, wherein the control circuitry is configured to generate for display, for each database record of the plurality of database records, the plurality of options to modify whether or not the content provider should be granted access to the respective database record by:

generating for display a graphical user interface comprising the plurality of options and an additional option to deny a particular content provider access to each of the database records associated with the user profile.

20. The system of claim 12, wherein the control circuitry is configured to generate for display, for each database record of the plurality of database records, the plurality of options to modify whether or not the content provider should be granted access to the respective database record by:

generating for display a graphical user interface comprising in tabular form the plurality of database records to the user along with a respective option, of the plurality of options, for each respective database record to modify whether or not the content provider should be granted access to the respective database record.

\* \* \* \* \*